United States Patent [19]

Childs et al.

[11] Patent Number: 4,582,139

[45] Date of Patent: Apr. 15, 1986

[54] SET RETARDED CEMENT COMPOSITIONS AND WELL CEMENTING METHODS

[75] Inventors: Jerry D. Childs; Freddie L. Sabins, both of Duncan, Okla.

[73] Assignee: Halliburton Company, Duncan, Okla.

[21] Appl. No.: 668,767

[22] Filed: Nov. 6, 1984

Related U.S. Application Data

[63] Continuation-in-part of Ser. No. 540,742, Oct. 11, 1983, Pat. No. 4,524,828.

[51] Int. Cl.$^4$ ............................................. E21B 33/138
[52] U.S. Cl. ........................................ 166/293; 106/90; 106/93; 166/283; 166/295; 166/300; 523/130
[58] Field of Search ............... 166/283, 293, 295, 300; 106/90, 93; 523/130

[56] References Cited

U.S. PATENT DOCUMENTS

| | | | |
|---|---|---|---|
| 2,935,522 | 5/1960 | Samour | 260/429 R X |
| 3,094,425 | 6/1963 | Adams et al. | 106/90 |
| 3,582,375 | 6/1971 | Tragesser, Jr. | 106/90 |
| 3,619,221 | 11/1971 | Kossivas | 106/90 |
| 3,804,174 | 4/1974 | Chatterji et al. | 166/293 |
| 3,835,926 | 9/1974 | Clement, Jr. | 166/292 |
| 3,928,052 | 12/1975 | Clement, Jr. | 106/76 |
| 3,959,003 | 5/1976 | Ostroot et al. | 106/93 |
| 4,036,301 | 7/1977 | Powers et al. | 166/293 |
| 4,038,093 | 7/1977 | Brooks, Jr. | 106/93 |
| 4,082,563 | 4/1978 | Ellis et al. | 106/90 |
| 4,236,849 | 12/1980 | Kennedy-Skipton | 166/293 X |
| 4,280,848 | 7/1981 | Ellis et al. | 106/90 |
| 4,318,744 | 3/1982 | Dodson | 106/90 |
| 4,337,094 | 6/1982 | Tokar | 106/90 |
| 4,340,525 | 7/1982 | Hubner et al. | 166/293 X |
| 4,405,372 | 9/1983 | Serafin et al. | 106/90 |

*Primary Examiner*—George A. Suchfield
*Attorney, Agent, or Firm*—Robert A. Kent; Thomas R. Weaver

[57] ABSTRACT

Set retarded cement compositions for cementing across a zone or zones in a well having enhanced compressive strength development after placement across the zone or zones are provided. The cement compositions are comprised of hydraulic cement, sufficient water to form a pumpable slurry, one or more set retarders and a delayed retarder neutralizer comprised of one or more titanium chelates. Methods of cementing utilizing the compositions are also provided.

16 Claims, No Drawings

SET RETARDED CEMENT COMPOSITIONS AND WELL CEMENTING METHODS

CROSS-REFERENCE TO RELATED APPLICATION

This application is a continuation-in-part of application Ser. No. 540,742, filed Oct. 11, 1983, now U.S. Pat. No. 4,524,828.

BACKGROUND OF THE INVENTION

1. Field of the Invention

This invention relates generally to set retarded cement compositions and methods of cementing across zones in wells, and more particularly, but not by way of limitation, to set retarded cement compositions having enhanced compressive strength development after placement and methods of cementing across zones in wells using such compositions.

2. Description of the Prior Art

In cementing operations carried out in oil, gas and water wells, a hydraulic cement is normally mixed with sufficient water to form a pumpable slurry and the slurry is pumped across a subterranean zone or zones to be cemented by way of the wellbore penetrating such zone. After placement across the zone or zones, the cement slurry sets into a hard mass.

While cement compositions are utilized in carrying out a variety of operations in wells to accomplish a variety of purposes, cement compositions are most commonly used in primary cementing whereby casing and/or liners are bonded within the wellbore to the formations penetrated thereby. Cementing is accomplished by introducing a cement composition into the annular space between the casing or liner and the wellbore, generally by pumping the cement composition downwardly within the casing or liner to the bottom thereof and then upwardly into the annulus, and then allowing the cement composition to set into a hard mass therein.

One or more of the formations or zones adjacent the cemented annulus can contain fluids under pressure which enter and flow through the cement-containing annulus when the cementing procedure carried out therein is faulty or inadequate. The most common problem of this nature is the flow or migration of gas in the cemented annulus. Such gas can flow to the surface, create communication between producing or other subterranean formations or zones and can, when in high enough volume, create blowouts during the cementing operation between when the cement composition is placed and before the cement composition has set into a hard mass. Minor interzonal gas flow problems can lower production. When the magnitude of leakage requires remedial action, expensive secondary cementing procedures must be carried out.

The occurrence of annular gas flow in a cemented casing-wellbore annulus is believed to relate to the inability of the cement slurry to transmit hydrostatic pressure during the transition of the slurry from a true fluid to a hard, set mass. During this transition phase, initial hydration has begun and the slurry starts to develop static gel strength. Although the system has no compressive strength at this point, the cement column becomes partially self-supporting. This is a very critical period as far as potential gas entry into the cement column is concerned. That is, although the original hydrostatic pressure is trapped within the gelled cement matrix, any volume reductions of the aqueous phase at this point result in rapid decreases in the hydrostatic pressure due to the low compressibility of the fluid phase. Such volume reductions usually occur due to the ongoing hydration reactions and due to the loss of part of the fluid phase to the formation (fluid loss). In this situation, it is possible for the pressure within the cement matrix to fall below the gas entry limit and for gas migration to occur.

Static gel strength is the development of some internal rigidity in the matrix of the cement that will resist a force placed upon it. The development of static gel strength will start to occur immediately after pumping has stopped and will continue to increase until the cement is set. At some time before actual set, the cement will develop a static gel strength high enough to prevent a fluid from moving through it. Tests have indicated that a gel strength of 500 pounds per 100 square feet is sufficient to prevent any movement, although at certain conditions such gel strength can be considerably lower. When the cement has developed a static gel strength high enough to prevent formation fluids from moving through it, the cement is said to have completed its transition phase.

Volume reduction in the cement column can occur as a result of fluids lost from the cement slurry to the formation. Even when fluid loss is very low, small amounts of fluid are still lost from the slurry which can result in a pressure drop in the cement column during the transition phase thereof. Additionally, as the cement in the cement slurry hydrates, a volume reduction caused by such hydration results. Hydration volume reduction can ultimately be as high as three percent. Where the static gel strength development is slow and the volume reduction due to hydration and fluid loss are appreciable, the hydrostatic pressure exerted by the cement column on adjacent formations can drop below the pressure of formation fluids thereby allowing the fluids to enter the cement-filled annulus. If the gel strength of the cement slurry is not high enough to prevent further movement of formation fluids, a fingering or migration phenomena will occur and annular gas leakage and/or interzonal communication will ultimately result. However, where the gel strength is high enough, the flow of formation fluids through the cement column is prevented.

Traditionally, the petroleum industry has attempted to prevent annulus formation fluid flow by increasing the cement slurry density, improving mud displacement, controlling mud-cement slurry compatibility, using fluid loss control additives, causing the cement slurry to expand after setting, and multiple stage cementing. Although these techniques are helpful and have shown some measure of success, none have completely solved the problems. New techniques using cement slurries containing gas whereby the cement slurries are compressible have attained a much greater degree of success. Such techniques are the subject matter of U.S. Pat. Nos. 4,304,298 and 4,340,427.

Another problem often encountered in cementing relates to the cement slurry developing compressive strength at a slow rate and/or the compressive strength development of the in-place cement column not being uniform. With the drilling of wells for the production of hydrocarbons to increased depths during recent years, extended cementing times are required to mix cement compositions and pump them into the annular space in the wells. In addition, at the greater depths, elevated temperatures are encountered which accelerate the normal setting rates of cement compositions to the point where the pumping times, i.e., the mixing and placement times, exceed the pumpable times of the cement compositions, making it difficult or impossible to place the cement compositions at the desired locations in the wells. In order to increase the pumpable times of cement compositions, various set retarding additives have been utilized in cement compositions. While such additives successfully extend the pumpable times between mixing and the setting of cement compositions, they are temperature sensitive, i.e., the higher the temperature of the cement slurry, the greater the quantity of set retarder additive required. In cementing operations, especially when a long liner is involved, the static temperature of the cement column at the top thereof after placement can be considerably lower than the static temperature of the column at the bottom of the annulus, i.e., at the bottom hole static temperature (BHST). In some cementing applications, the static temperature of the cement column at the top can be as much as 40° F. cooler than the BHST. In these applications, the cement slurries must contain set retarders in quantities to achieve required pumpable times at the highest temperature to which the cement slurry is heated, and consequently, after placement the cooler slurry at the top of the cement column can take an excessive time to set and to develop compressive strength whereby the continuation of well operations is delayed.

By the present invention, set retarded cement compositions for cementing across zones in wells are provided which have enhanced gel strength and compressive strength development after placement in the annulus. That is, the cement compositions develop high gel strength in a short period of time after placement followed by rapid compressive strength development. The rapid development of high gel strength in a short time span prevents fluid invasion into the annulus containing the cement composition even though the hydrostatic pressure of the cement column may fall below the pressure of formation fluids during the transition of the slurry to a solid mass. Further, the enhanced and uniform compressive strength development of the cement column in spite of a temperature differential over the length of the column shortens the down time required as a result of carrying out the cementing procedure.

SUMMARY OF THE INVENTION

A set retarded cement composition for cementing across a zone or zones in a well having enhanced compressive strength development after placement in the annulus is provided. The composition is comprised of hydraulic cement, sufficient water to form a pumpable slurry which will set into a hard mass, one or more set retarders present in the slurry in a quantity sufficient to retard the set of the slurry until after the slurry is placed in the annulus, and a delayed retarder neutralizer present in the slurry in a quantity sufficient to neutralize the one or more retarders and enhance the compressive strength development of the slurry after placement. The delayed retarder neutralizer is comprised of one or more alkanolamine titanium chelates which hydrolize in the cement slurry to bring about the delayed release of alkanolamines therein which in turn neutralize the retarding effect of the one or more set retarders therein. The cement composition can also include one or more titanium crosslinkable materials which provide thixotropic properties and gel strength development when crosslinked by titanium released from the alkanolamine titanium chelates to the composition. Methods of cementing subterranean zones penetrated by wellbores using the cement compositions are also provided.

While a principal object of the cement compositions and methods of this invention is to combat the problems mentioned above encountered in cementing operations carried out in wells, it is to be understood that the compositions and methods can be utilized in a variety of secondary and other well cementing operations.

DESCRIPTION OF PREFERRED EMBODIMENTS

The cement compositions of the present invention are comprised of pumpable aqueous hydraulic cement slurries containing various components which, after placement in an annulus to be cemented, set into hard masses having required compressive strengths. While various hydraulic cements can be utilized in forming the slurries, Portland cement is preferably utilized and can be, for example, one or more of the various types identified as API Classes A-H and J cements. These cements are identified and defined in *API Specification for Materials and Testing for Well Cements*, API Spec. 10, Second Edition, June 15, 1984, of the American Petroleum Institute which is incorporated herein by reference.

The thickening and initial set times of cement compositions are strongly dependent upon temperature and pressure. To obtain optimum results in oil, gas and water well applications, a variety of additives are often included in the cement compositions to vary the cement slurry density, increase or decrease strength, accelerate or retard thickening time, control fluid loss, reduce slurry viscosity, increase resistance to corrosive fluids, etc. Essentially, a cement meeting the specifications of the American Petroleum Institute is mixed with water and other additives to provide a cement slurry appropriate for the conditions existing in each individual well to be cemented.

In accordance with the present invention, a set retarded cement composition for cementing across a zone or zones in a well having enhanced and uniform compressive strength development after placement in tne annulus is provided. The composition is comprised of hydraulic cement, sufficient water to form a pumpable slurry which will set into a hard mass, one or more set retarders and a delayed retarder neutralizer.

The set retarders which can be utilized in the compositions of this invention are those which when present in the compositions in relatively small quantities retard the setting of the compositions, i.e., increase the time period between mixing and setting whereby required pumping times can be achieved. The particular duration of set retardation brought about by the retarders is dependent upon a variety of factors including the temperature of the cement compositions containing the retarders, the quantities of retarders utilized therein, the reactivity of the retarders with other components in the cement compositions, etc. Examples of particularly suitable such set retarders are salts of lignosulfonates, organic acids and their salts, mixtures of these compounds, and combinations of these compounds in admixture with one or more water soluble borates. Of these, calcium lignosulfonate and potassium pentaborate tetrahydrate in a 1:1 ratio by weight is preferred. All of the above-mentioned set retarders, and possibly all set retarders effective in cement compositions of the type herein contemplated, are neutralized, i.e., the set retardation effect thereof terminated, when contacted or reacted with amines such as triethanolamine.

As mentioned above, the cement compositions of the present invention include, in addition to the one or more set retarders described above, a delayed retarder neutralizer present in the composition in a quantity sufficient to neutralize the one or more set retarders and thereby bring about the enhanced and uniform compressive strength development of the composition after the placement thereof in an annulus to be cemented. Such delayed retarder neutralizer is comprised of an alkanolamine titanium chelate or a mixture of such chelates which when added to a hydraulic cement slurry, slowly hydrolize to liberate amines in the slurry. Particularly suitable such chelates include triethanolamine titanium chelate represented by the formula:

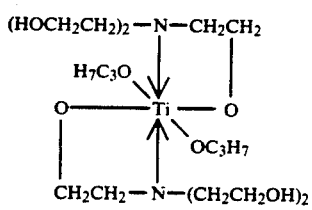

and modifications of such chelate which include replacement of the —$C_3H_7$ group with various other alkyl or aryl groups or replacement of the —$OC_3H_7$ groups with hydroxide or halogen atoms, and partially polymerized versions of these chelates. Other ligands useful in this class which may replace one or both of the triethanolamine ligands include $(R_1)_2N—R_2—OH$ where $R_1$ is hydrogen, alkyl, and/or hydroxyalkyl and $R_2$ is ethylene, trimethylene, or isopropylene (—$C(CH_3)_2$—), $R_4(R_5)N—R_3—N(R_6)(R_7)$ where $R_3$ is ethylene, trimethylene, or isopropylene (—$C(CH_3)_2$—) and $R_4$, $R_5$, $R_6$, and $R_7$ are individually hydrogen, alkyl, hydroxyalkyl, and/or aminoalkyl groups with the limitation that each possible molecule contains at least one hydroxyalkyl group, and various other alkanolamines. The modified complexes can contain in the range of from one to four alkanolamine ligands per titanium atom.

The preferred titanium chelate represented by the above formula is prepared by the reaction of titanium isopropoxide with two moles of triethanolamine to yield isopropoxytitanium triethanolamine chelate plus two moles of isopropyl alcohol. The product is a liquid containing about 8.3% titanium.

A preferred class of solid titanium chelates are described in U.S. Pat. No. 2,935,522 issued May 3, 1960, which is incorporated herein by reference. These chelates have the following general formula:

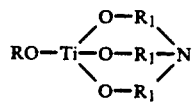

wherein R is isopropyl (—$C_3H_7$) and $R_1$ is ethylene or isopropylene. A particularly preferred chelate of this type for use in accordance with this invention is a chelate of the above formula wherein R is isopropyl and $R_1$ is ethylene, i.e., isopropoxytitanium triethanolamine chelate. This chelate is a white free-flowing solid which can be readily dry-blended with a hydraulic cement.

Modifications of the above chelate include products containing two triethanolamine groups represented by the structural formula:

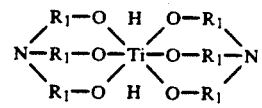

where $R_1$ is ethylene or isopropylene; and dimers with a structure represented by the following:

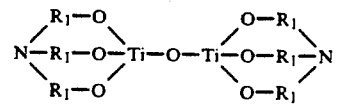

where $R_1$ is ethylene or isopropylene.

As mentioned above, the particular quantity of the one or more set retarders utilized in the cement compositions depends upon various factors including the time required and the temperature to which the cement composition will be heated during and after placement. Generally, the retarder or retarders are included in the cement compositions in amounts in the range of from about 0.1% to about 5.0% by weight of dry cement utilized therein. When the preferred retarder comprised of calcium lignosulfonate and potassium pentaborate tetrahydrate in a 1:1 ratio by weight is utilized, it is included in the cement compositions in amounts in the range of from about 0.5% to about 3.0% by weight of dry cement utilized.

The amounts of delayed retarder neutralizer or mixtures of neutralizers utilized in the cement compositions will vary with the amounts of retarder or retarders present, the amounts of crosslinkable material present, if any, and to some degree, the temperatures to which the cement compositions will be heated during and after placement. The general amount of retarder neutralizer used may vary as much as from 0.05% to about 1.5% by weight of dry cement used. The more usual and preferred range is from about 0.1% to about 0.5% by weight of dry cement. When combined with a cement slurry, the titanium chelate neutralizers slowly hydrolyze to release amines which in turn function in the slurry to neutralize the effects of the retarders. Thus, once the chelates hydrolyze and produce amines, the cement slurry will rapidly set and compressive strength will rapidly be developed.

A thixotropic set retarded cement composition of this invention having enhanced gel strength and compressive strength development after placement in the zone to be cemented is comprised of hydraulic cement, water, one or more set retarders, a crosslinkable material, and a crosslinking agent which also neutralizes the influence of retarders, i.e., an alkanolamine titanium chelate or mixture of chelates.

The crosslinkable material must be capable of being crosslinked by titanium as well as being water soluble and relatively non-reactive with other components in the cement compositions. Preferably, the material is selected from the group consisting of cellulose ethers exemplified by hydroxyalkylcellulose, carboxyalkylcellulose or carboxyalkylhydroxyalkylcellulose; polyvinyl alcohol; homopolymers, copolymers and terpolymers of AMPS (2-acrylamido-2-methylpropane sulfonic acid), sodium vinylsulfonate, acrylamide, N,N-dimethylacrylamide, acrylic acid and mixtures thereof. Most preferably, the crosslinkable material is selected from the group consisting of carboxymethylhydroxyethylcellulose, hydroxyethylcellulose, a copolymer of 2-acrylamido-2-methylpropane sulfonic acid and N,N-dimethylacrylamide and mixtures of these compounds.

The crosslinkable material is generally included in the thixotropic cement compositions of this invention in an amount in the range of from about 0.1% to about 2.0% by weight of dry cement utilized. A more preferred range of crosslinkable material is from about 0.2% to about 0.6% by weight of dry cement.

As will be understood, in the thixotropic cement compositions, as the crosslinking-retarder neutralizing agent slowly hydrolyzes, the released titanium crosslinks the crosslinkable material in the composition which brings about the rapid development of gel strength during the transition phase of the cement composition after placement. Simultaneously, the alkanolamines released react with or otherwise function to neutralize the retarding effect of the set retarders which in turn causes the cement composition to set and rapidly develop compressive strength after placement.

The quantities of the one or more set retarders and the alkanolamine titanium chelate or chelates utilized in the thixotropic set retarded cement compositions are essentially the same as set forth above for the non-thixotropic set retarded cement compositions.

A preferred set retarded cement composition of this invention is comprised of hydraulic cement, sufficient water to form a pumpable slurry which will set into a hard mass, one or more set retarders selected from the group consisting of salts of lignosulfonates, organic acids and their salts, mixtures of the foregoing compounds and one or more of the foregoing compounds in admixture with one or more water soluble borates present in the composition in an amount in the range of from about 0.1% to about 5.0% by weight of dry cement therein, and a delayed retarder neutralizer comprised of one or more of the titanium chelates described above present in the composition in an amount in the range of from about 0.05% to about 1.5% by weight of dry cement.

The most preferred such cement composition includes a set retarder comprised of calcium lignosulfonate and potassium pentaborate tetrahydrate in a 1:1 ratio by weight present in the composition in an amount in the range of from about 0.5% to about 1.5% by weight of dry cement, and isopropoxytitanium triethanolamine chelate present in the composition in an amount in the range of from about 0.1% to about 0.5% by weight of dry cement.

A preferred thixotropic set retarded cement composition of this invention is comprised of hydraulic cement, sufficient water to form a pumpable slurry which will set into a hard mass, a set retarder for delaying the set of the slurry selected from the group consisting of salts of lignosulfonates, organic acids and their salts, mixtures of the foregoing compounds and one or more of the foregoing compounds in admixture with one or more water soluble borates present in the composition in an amount in the range of from about 0.1% to about 5.0% by weight of dry cement, a crosslinkable material for producing thixotropic properties and gel strength development in said composition when crosslinked with titanium selected from the group consisting of carboxymethylhydroxyethylcellulose, hydroxyethylcellulose, a copolymer of 2-acrylamido-2-methylpropane sulfonic acid and N,N-dimethylacrylamide and mixtures thereof present in the composition in an amount in the range of from about 0.1% to about 2.0% by weight of dry cement, and the titanium chelate or mixture of chelates described above present in the composition in an amount in the range of from about 0.05% to about 1.5% by weight of dry cement therein.

The most preferred thixotropic, set retarded cement composition includes a set retarder comprised of calcium lignosulfonate and potassium pentaborate tetrahydrate in a 1:1 ratio by weight present in the composition in an amount in the range of from about 0.5% to about 3.0% by weight of dry cement, a crosslinkable material comprised of carboxymethylhydroxyethylcellulose present in the composition in an amount in the range of from about 0.2% to about 0.6% by weight of dry cement and isopropoxytitanium triethanolamine chelate present in the composition in an amount in the range of from about 0.1% to about 0.5% by weight of dry cement therein.

In carrying out the method of the present invention, a set retarded or thixotropic, set retarded cement composition is formed including one or more retarders present in a quantity sufficient to retard the set of the composition until after it is placed across the interval to be cemented. The delayed retarder neutralizer is included in the composition in a quantity sufficient to neutralize the retarder after placement of the composition whereby rapid gel strength and compressive strength development take place. In the case of a thixotropic composition including crosslinkable material, the crosslinker-retarder neutralizer simultaneously crosslinks the crosslinkable material and neutralizes the retarder bringing about the formation of high gel strength during the transition phase as well as the rapid and uniform development of compressive strength thereafter. The set retarded cement compositions are pumped across the interval to be cemented and then allowed to set into a hard mass.

The pumping times of the compositions can be extended by the inclusion of retarders therein up to 12 hours at bottom hole circulating temperatures of up to 400° F. As mentioned above, the in situ hydrolysis of the alkanolamine chelates is slow whereby the set retarders are not totally neutralized nor is the crosslinkable material completely crosslinked until after placement of the cement compositions.

In order to facilitate a clear understanding of the methods and compositions of this invention, the following Examples are given.

EXAMPLE 1

A series of tests are conducted to determine how effective a variety of titanium chelates are in producing thixotropic behavior. The cement slurries tested are prepared by dry blending all the additives with the cement prior to addition to water. If any liquid additives are used, the liquid is added to the mixing water prior to adding cement. The cement slurry is placed in a static gel strength measuring device and a standard thixotropic test is conducted.

The static gel strength measuring apparatus consists of three major components, the chamber and lid, the magnetic drive assembly, and the cord pulling assembly.

The chamber is a heavy wall, high strength metal vessel equipped with strip heaters attached directly to the outside of the chamber. A thermocouple is inserted into the vessel to allow the temperature of the vessel to be controlled. The lid of the chamber is equipped so that the principal drive shaft of the magnetic drive assembly can be inserted. On the shaft a stirring paddle is fitted over one end of the shaft and secured with a shear pin. On the other end of the principal drive shaft the magnetic drive head is connected. The magnetic drive head is then in turn connected by a belt system to a variable speed magnetic drive power source and torque measuring device. A thermocouple is inserted through the top of the magnetic drive head and down the middle of the hollow principal drive shaft. The lid of the chamber is equipped with two ports. One port is connected to a pressure volume pump used to generate pressure and the other port is equipped with a quick opening safety valve. The bottom of the chamber is equipped with a quick opening valve and used to relieve the pressure and discharge the test slurry at the end of the test period. The cord pulling mechanism consists of a cord pulling capstan or drum arrangement driven by a variable speed gear motor with the cord running through the pulley arrangement to a load cell and then to the top of the magnetic drive head.

To determine the gel strength development of cement slurry under down hole conditions, this equipment was specifically designed for measuring static gel strength after a stirring period that simulated slurry placement. The equipment is designed to operate at a maximum temperature of 400° F. at 10,000 psi. The low friction magnetic drive allows the slurry to be stirred while monitoring consistency during the stirring time. After simulating placement time, the motor is shut off and the cord pulling system is attached to the magnetic drive head. Static gel strength is determined by continuously measuring the torque required to rotate the paddle at a very slow speed (0.5° to 2.0° per minute). At such speeds, a magnetic drive has very low friction and very accurate torque measurements can be made. Since the torque measuring system consists of a cord pulling capstan or drum arrangement driven by a variable speed gear motor, accurate continuous rotation and means for continuously recording the torque are provided. The gel strength is then calculated from the torque measurement and the vessel geometry. The slow movement of the paddle allows static gel strength to be measured but does not inhibit gel strength development. Continuous static gel strength values can be measured up to a maximum of 1000 lbs/100 ft$^2$.

The standard thixotropic test procedure is as follows:
1. stir the slurry with the magnetic drive consistometer for one hour while increasing temperature and pressure from ambient conditions to bottom hole circulating temperature (BHCT) and bottom hole pressure (BHP) according to schedule;
2. after one hour of stirring, set static for 15 minutes while continually measuring static gel strength;
3. after a static period of 15 minutes, stir for 15 minutes while continually measuring consistency; and
4. repeat static and stirring times a total of three times.

In the data that is developed, one basic slurry composition is tested. This slurry consists of API Class H cement, 0.4% carboxymethylhydroxyethylcellulose by weight of cement, 44% water by weight of cement and retarder as given in Table I.

Table I provides the range of temperatures, pressures and retarder amounts used in each simulated well condition. The temperature range varies from 140° F. to 275° F. The amount of retarder utilized is sufficient to provide at least 3½ hours thickening time at test conditions where thickening time is taken as the definition given in API Specification 10.

TABLE I

| Test Conditions and Retarder Amounts | | |
|---|---|---|
| Temperature (°F.) | Pressure (psi) | Percent by Weight Retarder* |
| 140 | 6000 | 0.4 |
| 170 | 8000 | 1.2 |
| 180 | 8000 | 1.2 |
| 200 | 8000 | 1.6 |
| 215 | 8000 | 2.0 |
| 245 | 8000 | 2.2 |
| 275 | 8000 | 2.4 |

*The retarder used is a 1:1 mixture of calcium lignosulfonate and potassium pentaborate tetrahydrate.

Table II provides the physical and chemical properties of the compounds tested.

TABLE II

| Compound | Physical Form | Chemical Description |
|---|---|---|
| Zirconium oxychloride | Solid | Zirconium oxychloride (zirconyl chloride)- ZrOCl$_2$ |
| Zirconium acetylacetonate | Liquid | Zirconium chelate of acetylacetone |
| Titanium oxychloride | Liquid | Titanium oxychloride (TiOCl$_2$) |
| Titanium triethanolamine | Liquid (non-aqueous) | Prepared by reaction of titanium isopropoxide with two moles of triethanolamine. Ti(OCH(CH$_3$)$_2$)$_4$ + 2N(CH$_2$CH$_2$OH)$_3$→ (C$_3$H$_7$O)$_2$Ti[OCH$_2$CH$_2$N(CH$_2$CH$_2$OH)$_2$]$_2$ + 2C$_3$H$_7$OH The two moles of isopropyl alcohol are left in the reaction mixture. Thus, this compound consists of triethanolamine titanate plus isopropyl alcohol. |
| Titanium monotriethanolamine | Solid | Titanium Monotriethanolamine, [N(CH$_2$CH$_2$O—)$_3$]Ti[OCH(CH$_3$)$_2$], contains about 19.0% titanium by weight. |
| Titanium monotriethanolamine plus fructose (Blend I) | Solid | A mixture of 57% titanium monotriethanolamine and 43% fructose by weight |
| Titanium monotriethanolamine plus | Solid | A mixture of 73% titanium monotriethanolamine and 27% fructose by weight |

TABLE II-continued

Physical and Chemical Properties of Compounds Considered as Thixotropic Cement Additives

| Compound | Physical Form | Chemical Description |
|---|---|---|
| fructose (Blend II) | | |
| Titanium triethanolamine deposited on diatomaceous earth | Solid | Titanium triethanolamine deposited on diatomaceous earth. Contains about 4.1% Ti by weight |
| Titanium monotriethanol-amine solution | Liquid | Solution of titanium monotriethanolamine containing about 7.6% Ti by weight |
| Hydrolyzed, partially polymerized titanium acetylacetonate | Solid | Organic titanate (chelate) from hydrolyzed titanium acetylacetonate. Prepared by controlled addition of water as illustrated below. $Ti(Cl)_2[OC(CH_3)=CHCOCH_3]_2 + 2H_2O \rightarrow Ti(OH)_2[OC(CH_3)=CHCOCH_3]_2 + 2HCl$ $Ti(OH)_2(OC(CH_3)=CHCOCH_3)_2 + H_2O \rightarrow$ partially polymerized, solid product. |
| Titanium lactate | Liquid (aqueous) | Prepared by the reaction of titanium isopropoxide with two moles of lactic acid in presence of water. $Ti(OCH(CH_3)_2)_4 + 2CH_3CH(OH)COOH \rightarrow [Ti(OH)_2(OCH(CH_3)COO^-)_2][H+]_2 + 4C_3H_7OH$ The acidic protons are neutralized with ammonium hydroxide. This product may be described as the ammonium salt of titanium lactate. However, the structure of this product is complicated by polymerization of the titanium chelate to some degree. |
| Polymerized titanium lactate | Solid | Polymerized titanium lactate. Prepared from the titanium lactate. Extent of polymerization has been increased to insolublize the chelate and yield a solid containing about 21.4% Ti. |
| Lactic acid reacted with hydrated $TiO_2$ | Solid | One mole of lactic acid reacted with two moles of hydrated $TiO_2$. Ti content is about 20.8% by weight |
| Titanium tartrate | Liquid | Tartaric acid analog of titanium lactate. Contains about 8.2% Ti by weight |
| Titanium malate | Solid | Titanium malate which has been spray dried. Contains about 7.9% Ti by weight |
| Titanium acetylacetonate | Liquid (non-aqueous) | Prepared by the reaction of titanium isopropoxide with two moles of acetylacetone. $Ti(OCH(CH_3)_2)_4 + 2(CH_3COCH_2COCH_3) \rightarrow Ti(OC_3H_7)_2[OC(CH_3)=CHOCH_3]_2 + 2C_3H_7OH$ The two moles of isopropyl alcohol are left in the reaction mixture. |

Table III provides the actual data obtained. The additive description along with the amount of additive used (by weight of cement), temperatures and actual get strength measurements are shown. The retarder level at each temperature is given in Table I. The gel strengths given are the maximum strength in pounds per 100 feet square reached during each 15 static minute period.

TABLE III

| | Gel Strength Measurements[a] | | | | |
|---|---|---|---|---|---|
| Additive | Percent Addition (bwc) | Temperature (°F.) | Gel Strength (lbs/100 ft$^2$) | | |
| | | | 1 | 2 | 3 |
| None | 0 | 140 | 12 | 30 | 70 |
| Zirconium oxychloride | 1.0 | 140 | 60 | 70 | 60 |
| | 1.0 | 200 | 75 | 100 | 95 |
| Zirconium acetylacetonate | 0.5 | 140 | 75 | 100 | 160 |
| Titanium oxychloride | 0.5 | 140 | 365 | — | — |
| Titanium triethanolamine | 0.25 | 140 | 30 | 40 | 32 |
| | 0.50 | 140 | 0 | 0 | 30 |
| | 0.50 | 200 | 350 | 205 | 212 |
| | 0.50 | 275 | 305 | 310 | 225 |
| Titanium monotriethanol-amine | 0.25 | 140 | 50 | 6 | 15 |
| | 0.25 | 140 | 40 | 20 | 15 |
| | 0.50 | 140 | 50 | 50 | 50 |
| | 0.50 | 140 | 25 | 25 | 25 |
| | 0.25 | 180 | 200 | 320 | 270 |
| | 0.25 | 215 | 500 | 500 | 500 |
| | 0.25 | 275 | 265 | 250 | 220 |
| | 0.50 | 275 | 225 | 500 | 500 |
| Titanium mono-triethanolamine plus fructose (Blend I) | 0.50 | 140 | 500 | 500 | 500 |
| | 0.50 | 275 | 80 | 90 | 85 |
| | 0.50 | 275 | 70 | 100 | 100 |
| Titanium mono-triethanolamine plus fructose (Blend II) | 0.25 | 140 | 400 | 500 | — |
| | 0.50 | 140 | 500 | 500 | 500 |
| | 0.50 | 180 | 200 | 210 | — |
| | 0.50 | 215 | 500 | 500 | 500 |
| | 0.50 | 275 | 500 | 500 | 500 |
| Titanium triethanolamine deposited on diatomaceous earth | 0.50 | 140 | 135 | 120 | 100 |
| Titanium mono-triethanolamine | 0.25 | 180 | 500 | 200 | 250 |
| | 0.50 | 180 | 450 | 500 | 500 |

TABLE III-continued

Gel Strength Measurements[a]

| Additive | Percent Addition (bwc) | Temperature (°F.) | Gel Strength (lbs/100 ft²) 1 | 2 | 3 |
|---|---|---|---|---|---|
| solution | | | | | |
| Hydrolyzed, partially polymerized titanium acetylacetonate | 0.5 | 140 | 205 | 200 | 205 |
| Titanium Lactate | 0.25 | 170 | 160 | 200 | 215 |
| Polymerized titanium lactate | 0.5 | 275 | 270 | 330 | 235 |
| Lactic acid reacted with hydrated TiO₂ | 0.5 | 140 | 350 | 400 | 300 |
| | 0.5 | 200 | 160 | 160 | 195 |
| | 0.5 | 275 | 40 | 35 | 40 |
| Titanium tartrate | 0.5 | 140 | 115 | 150 | 155 |
| | 0.5 | 275 | 180 | 390 | 280 |
| Titanium malate | 0.5 | 140 | 500 | 500 | 500 |
| | 0.5 | 275 | 20 | 40 | 45 |
| Titanium acetylacetonate[b] | 0.5 | 245 | 450 | 500 | 500 |

[a] Slurry composition: Class H Cement, 0.4% CMHEC, 44% H₂O
[b] Replacement of CMHEC with HEC in slurry formulation The foregoing data indicates the operability of alkanolamine titanium chelates in crosslinking CMHEC to impart thixotropic properties to cement compositions.

EXAMPLE 2

A cement composition of the present invention is used in carrying out a primary cementing job in the field. The well conditions are as follows:
Total depth: 12,000 ft.
Wellbore size: 6¾ inches,
Casing size: 2⅞ inch long string,
Bottom hole circulating temperature: 239° F.,
Bottom hole static temperature: 300° F.,
Well fluid: 15.4 lbs/gal mud,
Displacement fluid: 2% KCl water.

A slurry having the following composition is first prepared and tested in the laboratory:
Class H Cement+30% coarse silica+4% CMHEC+0.5% potassium pentaborate+0.5% calcium lignosulfonate+0.25% titanium triethanolamine
Slurry density—16.4 lbs/gal,
Slurry volume—1.35 ft³/sk,
Slurry water—5.2 gal/sk.

The laboratory gel strength tests indicate this slurry develops static gel strength of 500 lbs/100 ft² in 20 minutes at a bottom hole circulating temperature of 240° F. and a pressure of 8000 psi. The job is run and considered successful by the customer. No gas flow is observed on the well and the casing shoe withstands the pressure test. Adequate compressive strength is developed in good time after placement of the slurry.

EXAMPLE 3

A cement composition of the present invention is used in carrying out a cementing job in the area of Monahans, Tex. The well conditions are as follows:
Total depth: 21,300 ft.
Depth of last casing: 10,646 ft.
Liner size: 5½ inches
Hole size: 8½ inches
Top of cement: 10,600 ft.
Bottom hole static temperature: 320° F.
Bottom hole circulating temperature: 294° F.
Static temperature at top of cement: 150° F.
Mud density: 11.5 lbs/gal (invert emulsion)
Cement density: 13.5 lbs/gal Due to the extreme well conditions, conventional cement formulations tested do not achieve initial sets at top of cement conditions even after 72 hours curing time.

A cement slurry of the following composition is prepared and tested:

[A mixture of 65% by volume Class H cement and 35% by volume fly ash]+17.5%* fine silica+0.5% hydroxyethylcellulose+0.5% carboxymethylhydroxyethylcellulose+0.8% calcium lignosulfonate+0.8% potassium pentaborate+0.5% titanium triethanolamine.
(*All additive percents are by weight of the cement, fly ash mixture.)

The above described cement slurry has the following compressive strengths with a thickening time of 5 hours 54 minutes.

| Temperature | Compressive Strengths Hours | PSI |
|---|---|---|
| 320° F. | 24 | 600 |
| | 48 | 1000 |
| | 72 | 1700 |
| 150° F. | 24 | 400 |
| | 48 | 500 |
| | 72 | 700 |

The job is conducted and hard cement is found 400 feet on top of the liner in 48 hours and the liner tap tests to 5000 psi.

What is claimed is:

1. A method of cementing a subterranean zone penetrated by a wellbore comprising the steps of:

forming a pumpable set retarded thixotropic cement slurry having enhanced compressive strength development after placement across said zone or zones comprised of hydraulic cement, water, one or more retarders present in said slurry in an amount sufficient to retard the set of said slurry until after placement thereof, a crosslinkable material present in said slurry in an amount sufficient to provide thixotropic properties and gel strength development when crosslinked to said composition, and a crosslinking retarder neutralizing agent present in said slurry in an amount sufficient to crosslink said crosslinkable material and to neutralize said set retarders after placement of said slurry in said zone, said crosslinking-retarder neutralizing agent being selected from the group consisting of alkalnolamine titanium chelates and mixtures of chelates represented by the formulae:

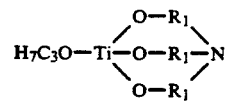

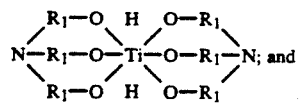

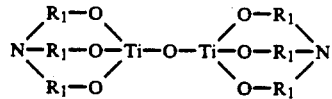

wherein

R₁ is ethylene or isopropylene;
pumping said cement slurry into said zone by way of said wellbore; and
allowing said cement slurry to set therein.

2. The method of claim 1 wherein said one or more retarders are selected from the group consisting of salts of lignosulfonates, organic acids and their salts, mixtures of the foregoing compounds and one or more of the foregoing compounds in admixture with one or more water soluble borates and are present in said composition in an amount in the range of from about 0.1% to about 5.0% by weight of dry cement therein.

3. The method of claim 2 wherein said crosslinkable material is selected from the group consisting of carboxymethylhydroxyethylcellulose, hydroxyethylcellulose, a copolymer of 2-acrylamido-2-methylpropane sulfonic acid and N,N-diethylacrylamide and mixtures of these compounds present in said composition in an amount in the range of from about 0.1% to about 2.0% by weight of dry cement therein.

4. The method of claim 3 wherein $R_1$ of said titanium chelate is ethylene and said titanium chelate is present in said composition in an amount in the range of from about 0.1% to about 0.5% by weight of dry cement therein.

5. In a method of cementing a liner in a wellbore using a set retarded aqueous hydraulic cement slurry wherein the cement slurry is subjected to a temperature differential after placement up to about 50° F., the improvement comprising adding to the cement slurry to enhance and make uniform the compressive strength development thereof after placement, an effective amount of a delayed retarder neutralizer selected from the group consisting of alkanolamine titanium chelates and mixtures of such chelates represented by the formulae:

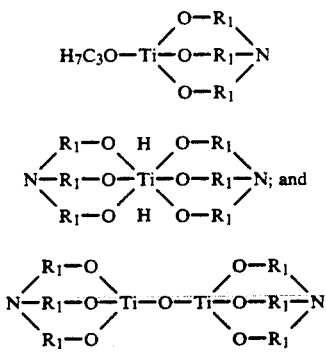

where $R_1$ is ethylene or isopropylene.

6. The method of claim 5 wherein said alkanolamine titanium chelate or mixture of chelates is added to said slurry in an amount in the range of from about 0.05% to about 1.5% by weight of dry cement therein.

7. The method of claim 6 wherein said cement slurry is retarded by including therein a retarder comprised of calcium lignosulfonate and potassium pentaborate in a 1:1 ratio by weight present in said slurry in an amount in the range of from about 0.1% to about 5.0% by weight of dry cement therein.

8. The method of claim 7 wherein said delayed retarder neutralizer is isopropoxytitanium triethyanolamine and is added to said slurry in an amount in the range of from about 0.1% to about 0.5% by weight of dry cement therein.

9. A method of cementing a subterranean zone penetrated by a well bore comprising:
providing a set retarded aqueous hydraulic cement slurry;
admixing with said cement slurry to enhance the compressive strength development thereof after placement, an effective amount of a delayed retarder neutralizer selected from the group consisting of:
a triethanolamine titanium chelate represented by one of the formula:

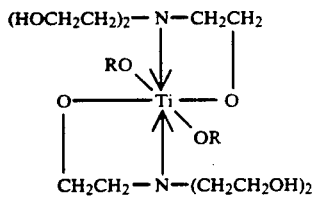

wherein R is independently an alkyl or aryl group,

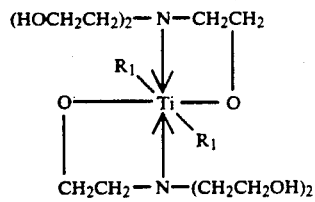

wherein $R_1$ is independently $OC_3H_7$, OH or a halogen atom, and
partially polymerized chelates produced from said triethanolamine chelates,
and placing said cement slurry across said zone or zones by way of said well bore and allowing said cement slurry to set into a hard mass therein having enhanced compressive strength.

10. The method of claim 9 wherein the delayed retarder neutralizer is present in said composition in an amount in the range of from about 0.05% to about 1.5% by weight of dry cement therein.

11. A method of cementing a subterranean zone penetrated by a well bore comprising:
providing a set retarded aqueous hydraulic cement slurry;
admixing with said cement slurry to enhance the compressive strength development thereof after placement, an effective amount of a delayed retarder neutralizer selected from the group consisting of:
a titanium chelate represented by one of the formula:

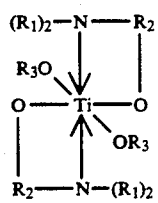

wherein
$R_1$ is independently hydrogen, an alkyl group, or a hydroxyalkyl group, $R_2$ is independently ethylene, trimethylene or isopropylene, and $R_3$ is independently an alkyl or aryl group,

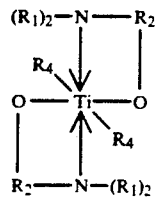

wherein $R_1$ is independently hydrogen, an alkyl group or a hydroxyalkyl group, $R_2$ is independently ethylene, trimethylene or isopropylene, and $R_4$ is independently $OC_3H_7$, OH or a halogen atom;

and placing said cement slurry across the zone or zones by way of said well bore and allowing said cement slurry to set into a hard mass therein having enhanced compressive strength.

12. The method of claim 11 wherein the delayed retarder neutralizer is present in said composition in an amount in the range of from about 0.05% to about 1.5% by weight of dry cement therein.

13. A method of cementing a subterranean zone penetrated by a well bore comprising:
providing a set retarded aqueous hydraulic cement slurry;
admixing with said cement slurry to enhance the compressive strength development thereof after placement, an effective amount of a delayed retarder neutralizer selected from the group consisting of:
a triethanolamine titanium chelate represented by the formula:

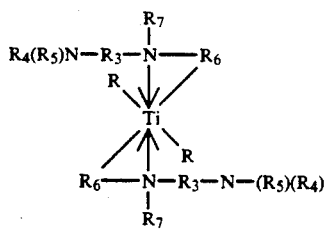

wherein

R is independently an oxyalkyl group, an oxyaryl group, OH or a halogen, $R_3$ is independently ethylene, trimethylene or isopropylene $R_4$ and $R_5$ are independently hydrogen, an alkyl group, a hydroxyalkyl group or an aminoalkyl group, $R_6$ is an oxyalkyl group, and $R_7$ is independently hydrogen, an alkyl group, a hydroxyalkyl group or an aminoalkyl group, $R_7$ is independently hydrogen, alkyl, hydroxyalkyl or an aminoalkyl group;

and placing said cement slurry across the zone or zones by way of said well bore and allowing said cement slurry to set into a hard mass therein having enhanced compressive strength.

14. The method of claim 13 wherein the delayed retarder neutralizer is present in said composition in an amount in the range of from about 0.05% to about 1.5% by weight of dry cement therein.

15. A method of cementing comprising:
providing a set retarded aqueous hydraulic cement slurry;
admixing with said cement slurry to enhance compressive strength development thereof after placement, an effective amount of a delayed retarder neutralizer selected from the group consisting of alkanolamine titanium chelates and mixtures of such chelates represented by the formulae:

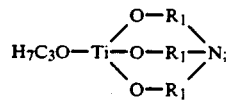

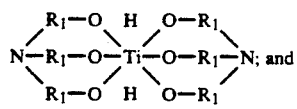

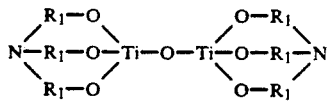

where $R_1$ is ethylene or isopropylene;

placing said cement slurry in a desired location and allowing said cement slurry to set into a hard mass having enhanced compressive strength.

16. The method of claim 15 wherein the delayed retarder neutralizer is present in said composition in an amount in the range of from about 0.05% to about 1.5% by weight of dry cement therein.

* * * * *